United States Patent
Malmberg

(10) Patent No.: US 7,030,530 B2
(45) Date of Patent: Apr. 18, 2006

(54) PERMANENT MAGNET ELEMENT AND ELECTRIC MACHINE

(75) Inventor: Jukka Malmberg, Helsinki (FI)

(73) Assignee: ABB Oy, Helsinki (FI)

(*) Notice: Subject to any disclaimer, the term of this patent is extended or adjusted under 35 U.S.C. 154(b) by 63 days.

(21) Appl. No.: 10/479,619

(22) PCT Filed: Jun. 13, 2002

(86) PCT No.: PCT/FI02/00514

§ 371 (c)(1),
(2), (4) Date: Dec. 4, 2003

(87) PCT Pub. No.: WO02/103882

PCT Pub. Date: Dec. 27, 2002

(65) Prior Publication Data

US 2004/0150281 A1   Aug. 5, 2004

(30) Foreign Application Priority Data

Jun. 14, 2001   (FI) ................... 20011265

(51) Int. Cl.
H02K 1/28 (2006.01)
H02K 1/30 (2006.01)
H02K 1/18 (2006.01)

(52) U.S. Cl. ............ 310/156.28; 310/156.23; 310/156.18; 310/156.08; 310/154.01; 310/154.03

(58) Field of Classification Search ........... 310/156.28, 310/156.08, 156.11, 156.12, 154.01, 154.03, 310/154.06, 154.13, 154.21, 154.24, 154.32, 310/154.37, 154.42, 154.49, 156.18
See application file for complete search history.

(56) References Cited

U.S. PATENT DOCUMENTS

| 4,841,186 A | * | 6/1989 | Feigel et al. ............ 310/156.12 |
| 4,855,630 A | | 8/1989 | Cole .......................... 310/156 |
| 4,910,861 A | * | 3/1990 | Dohogne ..................... 29/598 |
| 4,985,792 A | * | 1/1991 | Moir ....................... 360/99.08 |
| 5,073,738 A | * | 12/1991 | Tang ........................... 310/91 |
| 5,345,669 A | * | 9/1994 | Zigler et al. .................. 29/598 |
| 5,861,694 A | * | 1/1999 | Niemela ..................... 310/89 |
| 5,964,028 A | * | 10/1999 | Buse ........................... 29/598 |
| 6,017,156 A | * | 1/2000 | Depatie et al. ............. 396/463 |
| 6,452,301 B1 | * | 9/2002 | Van Dine et al. ....... 310/156.12 |
| 6,492,755 B1 | * | 12/2002 | Jones ................... 310/156.12 |
| 6,750,580 B1 | * | 6/2004 | Lai et al. ............... 310/156.28 |
| 2001/0003110 A1 | * | 6/2001 | Lay ............................ 482/57 |

FOREIGN PATENT DOCUMENTS

| EP | 0 410 048 | 1/1991 |
| EP | 1 037 359 | 2/2000 |
| JP | 5-191 938 | 1/1992 |

* cited by examiner

*Primary Examiner*—Darren Schuberg
*Assistant Examiner*—Erik Preston
(74) *Attorney, Agent, or Firm*—Dykema Gossett PLLC

(57) ABSTRACT

A permanent magnet element intended especially for electrotechnical devices and an electric machine, the element (1) comprising at least one permanent magnet piece (10). The permanent magnet element (1) also comprises a protective cover (11) that is arranged to partly surround the permanent magnet pieces (10) arranged in the element, and the permanent magnet element (1) also comprises one or more fastening elements (13; 21).

19 Claims, 2 Drawing Sheets

PERMANENT MAGNET ELEMENT AND ELECTRIC MACHINE

BACKGROUND OF THE INVENTION

The present invention relates to a permanent magnet element intended especially for electrotechnical devices, the element comprising at least one permanent magnet piece. The invention also relates to an electric machine as described in the preamble of claim 11.

Permanent magnets are generally used in electric machines for generating magnetic fields and further for utilizing the interaction between a magnet field and conductor in rotating electric machines. An example of a rotating electric machine is a permanently magnetized synchronous machine having permanent magnets mounted on its rotor and a three-phase winding typically mounted on its stator. When the rotor turns, the rotating magnetic flux generated by the magnets in the rotor crosses the stator windings and generates current in the stator coils. Correspondingly, when alternating current is fed into the stator, a magnetic flux is generated in the stator coils that when rotating turns the permanently magnetized rotor.

A problem with the present permanent magnets used in electrotechnical devices is the difficult fastening and small size of the permanent magnet pieces. When manufacturing large devices, it is necessary to handle a large number of fragile and intractable permanent magnet pieces, because the rotor diameter and axle length of powerful synchronous machines can be several meters.

To facilitate the mounting of permanent magnet pieces, the current way is to glue the pieces onto a metal plate that forms the permanent magnet element to mount. The pieces need then not be mounted one by one to the mounting point, such as on the surface of the rotor. After mounting, the immobility of the permanent magnet elements is typically ensured by winding a fibreglass band around the entire rotor and finally hardening the resin in the fibreglass band in an oven. After the elements are mounted, an extra work phase is thus required to secure the mounting. Especially the resin-hardening phase is long and slows down the final completion of the device. In addition, getting the piece into an oven is hard to accomplish, if the piece, for instance the rotor, is large. The fibreglass band is longitudinally quite strong and consequently, it provides a reliable support for the magnets against centrifugal forces when the magnets are mounted on a rotating rotor, for instance. The band does not, however, provide a sideways support for the magnets. In addition, when mounting permanent magnets or permanent magnet elements, external magnetic metal pieces fasten strongly to their surfaces and hamper and slow the mounting.

BRIEF DESCRIPTION OF THE INVENTION

It is an object of the present invention to provide a permanent magnet element that avoids the above-mentioned drawbacks and enables permanent magnets to be mounted on an electric device in a simpler manner than before. This object is achieved by a permanent magnet element of the invention which is characterized in that the permanent magnet element also comprises a protective cover that is arranged to partly surround the permanent magnet pieces arranged in the element, and that the permanent magnet element also comprises one or more fastening elements.

The invention is based on the idea that the permanent magnet element is formed of one or more permanent magnet pieces by encasing them partly within a protective cover. At its simplest, the encasing is done by making, for instance moulding, a plastic protective cover around the permanent magnet piece or pieces. As an alternative to moulding the cover directly around the pieces, the protective cover can also constructed by gluing or otherwise fastening the permanent magnet pieces to structural parts that form the casing around the pieces. In addition to plastic, different types of fibre structures can also be used as the material for the protective cover.

The permanent magnet element also comprises one or more fastening elements that allow the fastening of the permanent magnet element and the magnet pieces it contains to an electric device in a simple and reliable manner. The fastening elements can be attached to the casing structure for instance when the casing is made, at which time other additional parts can be attached to the cover.

The protective cover can be shaped as required so as to take into consideration the shapes of the mounting point. Required information related to the element can also be inserted to the protective cover during moulding.

The handling of the permanent magnet element of the invention becomes considerably easier than in the prior art, since fragile and shaped permanent magnets are under a protective cover. This means that extraneous objects do not fasten as tightly as before to the surface of the element and the cover also provides good protection against external impurities. In addition, the element of the invention provides reliable protection against corrosion of the permanent magnet pieces.

The invention also relates to an electric machine that comprises a rotor that is at least partly magnetized with permanent magnet elements, whereby the electric machine is characterized in that on the surface of the rotor permanent magnet elements are arranged that comprise one or more permanent magnet pieces and have one or more fastening elements for fastening the permanent magnet elements on a substantially even or curved rotor surface.

By means of such an electric machine, it is possible to utilize the simple structure of a permanently magnetized rotor achieved by the permanent magnet element of the invention, in which the magnetization of the rotor is done at least partly using permanent magnet elements. The structure of the rotor and the mounting of its magnets can then be done in quite a simple manner.

BRIEF DESCRIPTION OF THE FIGURES

The invention will now be described in more detail by means of preferred embodiments and with reference to the attached drawings, in which.

DETAILED DESCRIPTION OF THE INVENTION

Figure 1:
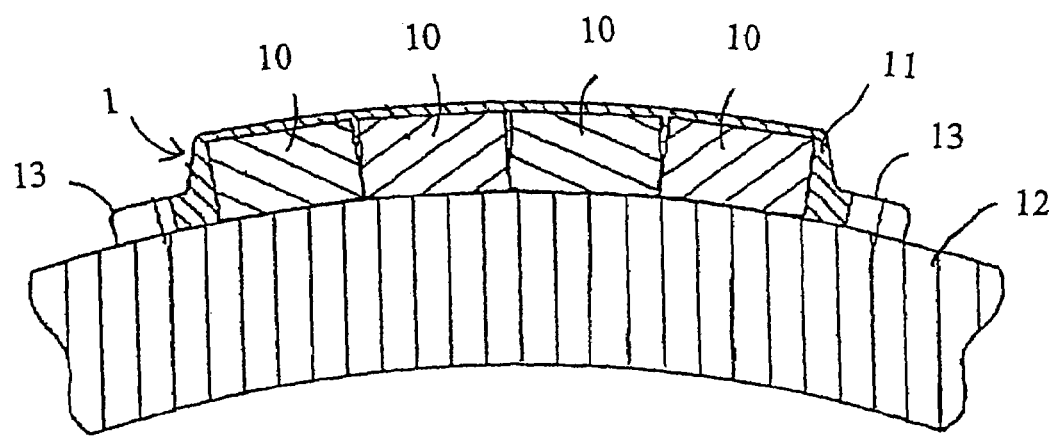
FIGS. 1 and 2 show an embodiment of the structure of the permanent magnet element of the invention.
Figure 2:
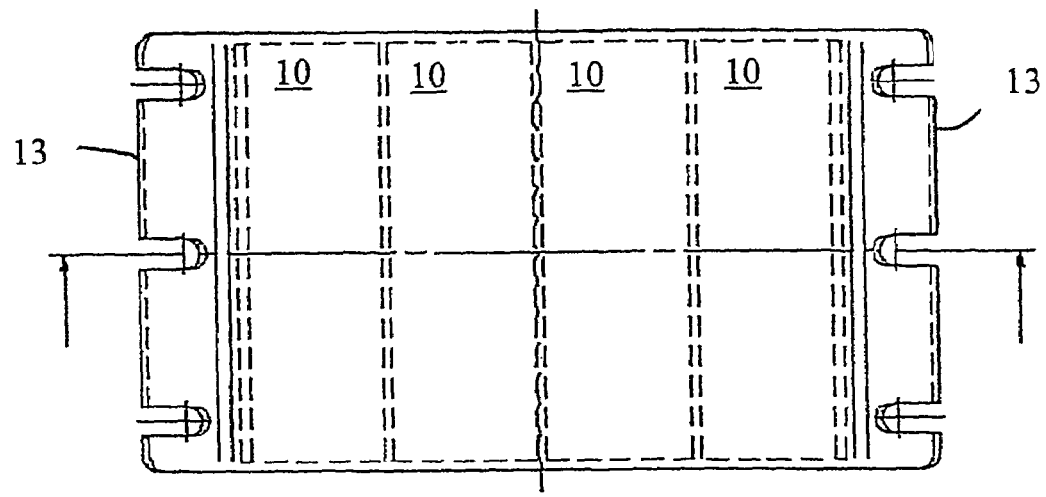

FIGS. 1 and 2 show the structure of an embodiment of the permanent magnet element 1 of the invention. FIG. 1 is a cross-section of the structure of FIG. 2, in which the permanent magnet element 1 is shown from the top. The element of the invention comprises at least one permanent magnet piece 10. In the examples of FIGS. 1 and 2, there are 4 of these pieces 10.

According to the invention, the permanent magnet element 1 further comprises a protective cover 11 that is arranged to partly surround the permanent magnet pieces in the element or the sole permanent magnet piece of the element. The protective cover 11 is preferably also made in such a manner that the pieces in the element fasten reliably with respect to each other, whereby the structure of the element becomes uniform and strong.

The element shown in the figures is fastened to an electrotechnical device that in the embodiments of the figures is the rotor 12 of an electric machine of the invention, which is to be magnetized using the permanent magnets. According to a preferred embodiment of the invention, the protective cover of the permanent magnet element is a casing-like structure with one side open. As shown in FIG. 1, the open side of the protective cover is against the mounting surface, i.e. in this case, against the surface of the rotor 12. The side of the protective cover coming against the mounting surface is open to minimize the length of the air gap formed in the magnet circuit. The sides of the protective cover that are between the elements being mounted can also be open, if the material of the protective cover is rigid enough for the purpose and able to keep the elements inside the cover. Otherwise the protective cover surrounds the piece or pieces substantially entirely.

According to one preferred embodiment of the invention, the protective cover 11 of the permanent magnet element 1 is made of polyamide or a corresponding plastic. This plastic protective cover is preferably made by moulding in such a manner that the permanent magnet pieces are set into the mould in desired positions with respect to each other before the plastic melt is poured in. This produces a finished structure in which the permanent magnet pieces are in their correct places. Another alternative for making the protective cover is to make it as such without the permanent magnet pieces. The permanent magnet pieces are then later glued or fastened in some other manner to the protective cover. The permanent magnet pieces are typically magnetized only after the element is ready. It is also possible to apply other known methods to make the protective cover 11 used in the invention, provided that the protective cover is made strong and reliable enough for fastening the magnet piece or pieces.

Examples of the method for making the protective cover include especially extrusion, injection moulding and vacuum moulding. Of these, extrusion is especially suited for cases where the protective cover has three open sides, i.e. on the side against the rotor surface and on two other sides.

The material of the protective cover can be for instance a polyamide with product name Zytel©, the holder of the trademark being DuPont. This polyamide is an injection-moulding plastic that has been found to meet the requirements set for the protective cover. Other suitable plastics are for instance polyurethane resin, fiberglass-reinforced resin, polyester laminate, i.e. fiberglass-reinforced polyester sheet, and various vinyl and epoxy plastics. Polyester laminate in particular has long been used and found a reliable material to use with electrotechnical devices. Polyester laminate is especially useful when the protective cover is made before the permanent magnet pieces are glued to it. It should also be understood that the selection of plastics suited for use in the solution of the invention is extensive.

The protective cover used in the solution of the invention can also be made of different types of fibre structures, such as glass, carbon and amide fibres or mixtures thereof. Fibre structures provide the advantage that they are strong and light, and a fairly thin structure produces a reliable protective cover.

According to the invention, the element 11 also comprises one or more fastening elements 13 for fastening the permanent magnet element. The fastening elements are metal tags or the like fastened to the plastic cover during moulding, through which the permanent magnet element can be reliably fastened to the surface of the electrotechnical device.

Figure 3:
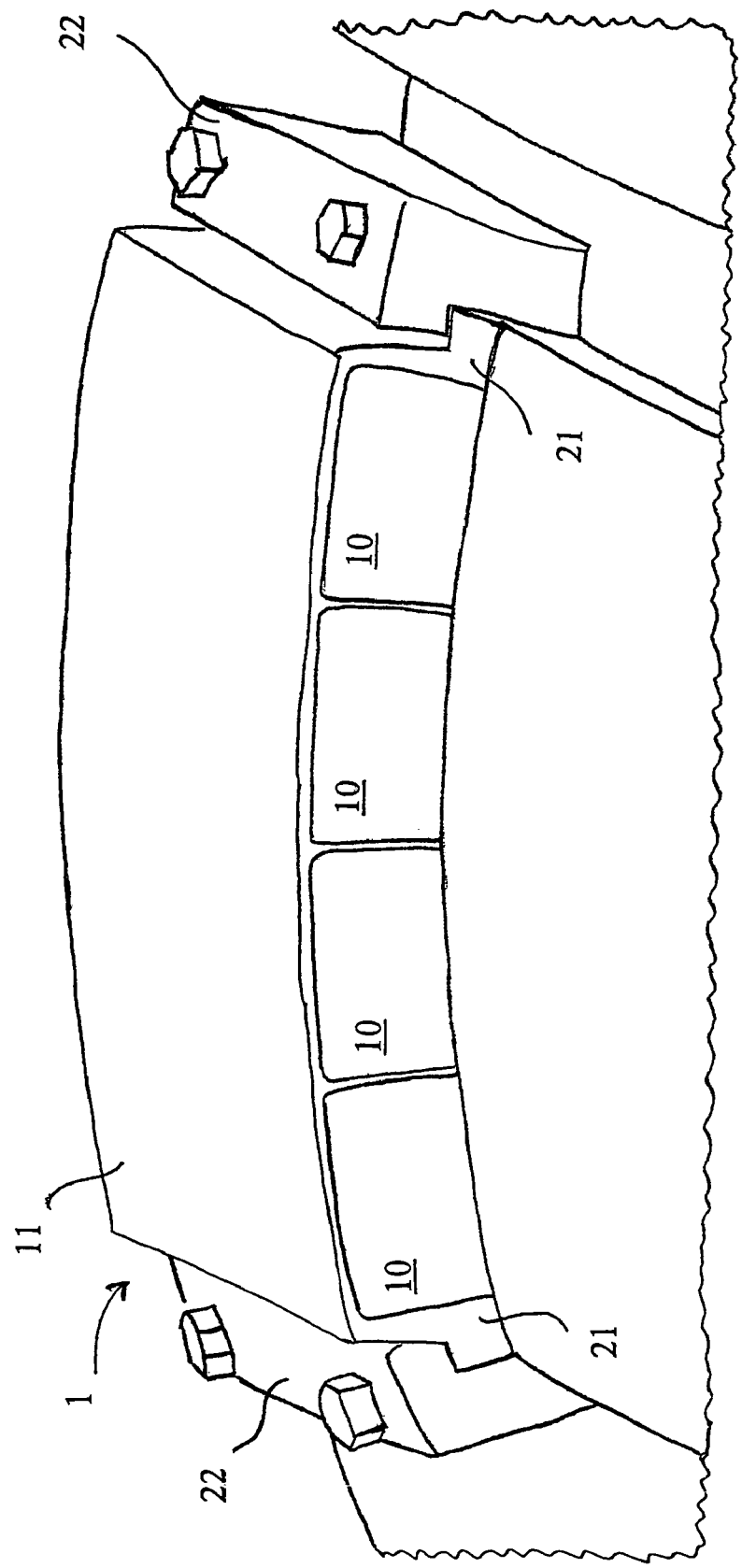
FIG. 3 shows the element of the invention fastened to an electrotechnical device.

The fastening of the element can be done as shown in FIG. 3, for instance. In FIG. 3, the element 1 is supported on the surface of the rotor by using lugs 21 added to the protective cover 11 of the element during moulding and fixtures 22 pressing to the lugs. The lugs are typically reinforced by metal during moulding to ensure fastening. In the embodiment of FIG. 3, the fixtures are fastened by bolts directly to the surface of the rotor in such a manner that corners formed in the fixtures press the lugs of the permanent magnet element and fasten the element reliably to the surface of the rotor. FIG. 3 only shows one of the several permanent magnet elements mounted on the surface of the rotor. The elements are mounted along the entire axial length of the rotor, thus forming one magnetic pole for the rotor. Similarly formed magnetic poles are placed on the circumference of the rotor as required by the design of the machine.

A previously known method for fastening magnet elements on the surface of a rotor is gluing, in which for instance thermally conductive glue can be used to conduct the heat of the rotor away from the rotor.

Because one magnetic pole is formed of a set of permanent magnet elements along the entire length of the rotor, the elements can be fastened reliably and simply as shown in FIG. 3, in which the fixture 22 is made of a profile piece longer than the axial length of one element. This way, one fixture fastens several elements 1 in place on the surface of the rotor. In the simplest case, the length of the fixture corresponds to that of the rotor, in which case only two fixtures are required for one magnetic pole. Numerous different implementations can, however, be used to fasten the permanent magnet element. It should be noted that in FIG. 3 the individual magnet pieces 10 inside the element are shown only for the sake of clarity. In a typical implementation, the permanent magnet pieces are inside a plastic protective cover.

The permanent magnet elements shown in the figure are simple in shape and the permanent magnet pieces in them are essentially positioned in straight lines like in a matrix. The invention is, however, not limited to such pieces, and the position of the pieces in relation to each other can vary freely inside the element as required in each case. An appropriate placement of the magnets inside the elements can for instance produce different types of magnetization patterns or obliqueness in the magnetization of the rotor of the electric machine according to the invention. The figures show a permanent magnet element having several permanent magnet pieces. According to the invention, the element can also contain only one permanent magnet piece.

During moulding, other additional parts, such as measuring sensors for determining the temperature, can also be added to the permanent magnet element of the invention. In addition, during moulding, it is also possible to include information on the direction of magnetization, i.e. polarity, in the plastic or other corresponding moulding material. This information can be presented in a simple manner by a pattern, for instance letters or other symbols, made during moulding or by using a colour code, whereby the colour of the protective covers of elements magnetized in a different manner are identified in a specific information content.

It is apparent to a person skilled in the art that while the technology advances, the basic idea of the invention can be implemented in many different ways. The invention and its embodiments are thus not limited to the examples described above, but can vary within the scope of the claims.

The invention claimed is:

1. A permanent magnet element for attachment to an outer surface of an electrotechnical device, comprising;
   at least one permanent magnet piece having a surface portion and being mountable with respect to the surface portion of the electrotechnical device for magnetically interacting therewith,
   a protective cover formed with at least one open side, said cover being arranged to partly surround the permanent magnet piece or pieces, said cover having inner surface portions for engaging the outer surface of the electrotechnical device-in confronting relationship, said cover for supporting the magnetic piece or pieces such that the surface portion of each magnetic piece or pieces is in alignment with the surface portion of the cover and likewise disposed in close proximity to the surface portion of the electrotechnical device, said cover having end portions, each end portion being formed with a circumferential flange having inner and outer surface portions, said flange extending laterally of the cover, the inner surface portions thereof for engaging the outer surface portions of the electrotechnical device in confronting relationship, and
   one or more fastening elements for radially engaging the outer surface portions of the flanges externally of each flange and securing the cover to the surface of the electrotechnical device.

2. An element as claimed in claim 1, wherein the protective cover is arranged to fasten the permanent magnet piece or pieces with respect to each other.

3. An element as claimed in claim 1, wherein the surface of the open side of the protective cover of the permanent magnet element is arranged to be connected against the surface portion of the electrotechnical device.

4. An element as claimed in claim 1, wherein the protective cover of the permanent magnet element is made of plastic or polyamide.

5. An element as claimed in claim 1, wherein the protective cover f the permanent magnet element is made of a fibre-reinforced plastic.

6. An element as claimed in claim 1, wherein the protective cover of the permanent magnet element is made of a fibre structure, including glass, or carbon or amide fibre.

7. An element as claimed in claim 1, wherein the protective cover of the permanent magnet element is made by moulding.

8. An element as claimed in claim 1, wherein the protective cover of the permanent magnet element is made by extrusion.

9. An element as claimed in claim 1, wherein the permanent magnet element also comprises one or more fastening elements for fastening the permanent magnet element to the electrotechnical device.

10. An element as claimed in claim 1, wherein the permanent magnet element also comprises one or more measuring sensors integrated to the protective cover or inside it.

11. An electric machine comprising:
    a rotor having an outer surface portion; and
    a permanent magnet element for at least partly magnetizing the rotor, said permanent magnet element comprising:
    one or more permanent magnet pieces each having a surface portion for engaging the outer surface of the rotor; and
    a protective cover formed with inner and outer surface portions and at least one open side formed in the inner surface portion, said cover being arranged to partly surround the permanent magnetic piece or pieces, the inner surface portions of the cover for engaging the outer surface of the rotor in confronting relationship, said cover for supporting the magnetic piece or pieces such that the surface portion of each magnetic piece or pieces is in alignment with the inner surface portions of the cover and likewise disposed in close proximity to the surface of the rotor, said cover having end portions, each end portion being formed with a circumferential flange having inner and outer surface portions, and the inner surface portion of the flange engaging the outer surface of the rotor, one or more fastening elements for engaging the outer surface portion of flanges and securing the cover in confronting relationship to the surface of the rotor.

12. An electric machine as claimed in claim 11, wherein the shape of the rotor is essentially round.

13. An electric machine as claimed in claim 11, wherein the protective cover comprises a casing like structure wherein the one open side thereof is arranged towards the surface of the rotor and the casing-like structure has at least a second open side.

14. An electric machine as claimed in claim 11, wherein the permanent magnet elements arranged on the rotor surface the rotor has a shape that is arranged to produce asymmetry or obliqueness in the magnetization of the rotor.

15. An electric machine as claimed in claim 11 wherein the protective cover comprises a non-magnetic material.

16. An electric machine as claimed in claim 11, wherein the protective cover comprises a material including at least one of polyamide, fibre-reinforced plastic, glass fiber, carbon fiber, and amide fiber.

17. An electric machine as claimed in claim 11 wherein the protective cover comprises a molded or extruded body.

18. An electric machine as claimed in claim 11 wherein the fasteners secure the flanges radially against the rotor.

19. An electric machine as claimed in claim 11 wherein the cover is rigid for securing the magnets against the rotor surface.

* * * * *